United States Patent [19]

Narumi

[11] Patent Number: 4,561,079
[45] Date of Patent: Dec. 24, 1985

[54] SUPPORT STRUCTURE OF AN OPTICAL PART

[75] Inventor: Ichiro Narumi, Tokorazawa, Japan

[73] Assignee: Pioneer Electronic Corporation, Tokyo, Japan

[21] Appl. No.: 530,394

[22] Filed: Sep. 8, 1983

[30] Foreign Application Priority Data

Sep. 8, 1982 [JP] Japan .................. 57-136163[U]

[51] Int. Cl.$^4$ .............................................. G11B 7/00
[52] U.S. Cl. ...................................................... 369/44
[58] Field of Search ............... 369/44, 45, 46, 111, 369/112, 119; 250/201; 350/252, 255, 486, 487, 485, 6.5, 6.6

[56] References Cited

U.S. PATENT DOCUMENTS

| | | | |
|---|---|---|---|
| 4,367,543 | 1/1983 | Araki et al. | 369/45 |
| 4,376,572 | 3/1983 | Gijzen | 350/486 |
| 4,462,096 | 7/1984 | Kusaka | 369/45 |
| 4,482,986 | 11/1984 | Noda et al. | 369/44 |

FOREIGN PATENT DOCUMENTS 57-208644 12/1982 Japan .................. 369/112

Primary Examiner—Donald McElheny, Jr.

Attorney, Agent, or Firm—Schwartz, Jeffery, Schwaab, Mack, Blumenthal & Evans

[57] ABSTRACT

A support structure of an optical part placed in an optical path of a light beam of a system for optically reading out recorded information, such as a video disc player system, including a first servo control system incorporating the optical part and a second servo control system respectively controlling a direction of the light beam in a pair of directions which are perpendicular to each other, the support structure supporting the optical part via an elastic member for permitting a movement of the optical part in accordance with an operation of the first servo control system. The elastic member has a configuration which is suited for selecting a resonant frequency of a movement of the optical part which causes a movement of the light beam in accordance with the operation of the second servo control system while allowing a normal movement of the optical part in accordance with the operation of the first servo control system, thereby to set the resonant frequency in a frequency range which is controllable by the operation of the second servo control system and to eliminate an undesirable result of the movement of the optical part other than the normal movement controlled by the first servo control system.

7 Claims, 4 Drawing Figures

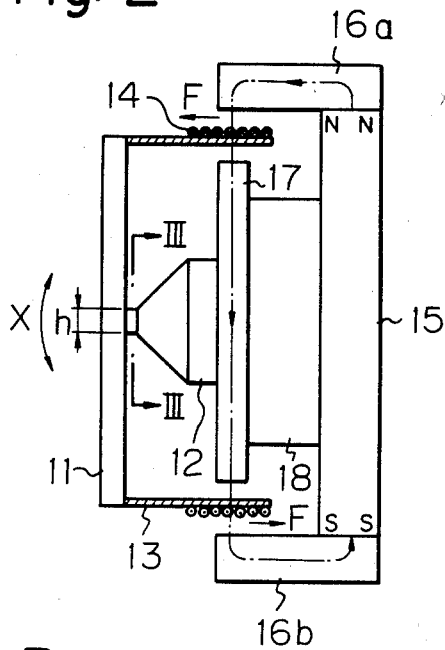
Fig. 2
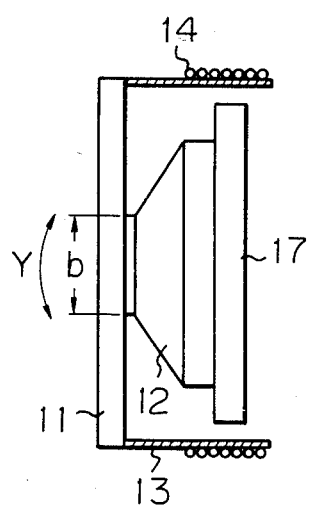
Fig. 3
Fig. 4

SUPPORT STRUCTURE OF AN OPTICAL PART

BACKGROUND OF THE INVENTION

1. Field of the Invention

The present invention relates to a support structure of an optical part, and more specifically to a support structure of an optical part such as a mirror or a lens of a system for optically reading out recorded information.

2. Description of Background Information

In a system for optically reading out recorded information such as a video disc player system, an optical part such as a mirror is disposed in an optical path of a light beam for reading out information, so as to direct an incident light beam to the recording surface of a recording disc, or directing a reflection of the read out light beam from the recording surface of the recording disc. Generally, such a mirror is mounted to be rotated around an axis parallel to a radial direction of the recording disc, or parallel to a tangential direction of a recording track of the recording disc. Therefore, the rotation of the mirror around this axis causes a movement of the light spot on the recording surface of the recording disc. A tracking servo control or a tangential servo control is thus effected in accordance with the rotating movement of the mirror.

In this type of arrangement, generally, the mirror is supported on an elastic support member which allows the rotation of the mirror around the axis of the rotation. However, due to the elasticity of the elastic support member, the mirror is also slightly movable in a direction other than the axis of rotation, in a direction perpendicular to the axis of rotation, for example. This movement is especially notable around a resonance frequency which is present in a high frequency range.

Therefore, in operation, the mirror may be rotated around an axis perpendicular to the proper axis of rotation during the driving of the mirror in accordance with a servo operation. Generally, this undesirable rotation of the mirror is a result of an error of the direction of the driving of the mirror, or unbalanced distribution of the mirror weight. If we assume that the mirror is utilized as a tracking mirror of a tracking servo system, the mirror is likely to rotate also along a tangential direction of the recording track, and such a tangential movement of the mirror will cause an external disturbance to the operation of a tangential servo system which is used for time axis correction. Further, if the frequency of the tangential movement of mirror is out of the range of the tangential servo control, it is difficult to compensate for the error of the time axis caused by the tracking servo control.

SUMMARY OF THE INVENTION

An object of the present invention is therefore to provide a support structure of an optical part, in which the optical part is firmly mounted on an elastic member so that movement of the optical parts along a direction other than the proper direction is prevented.

Another object of the present invention is to provide a support structure of an optical part, which allows a stable operation of a servo control system rotating the optical part without causing an adverse effect on the other servo control system which is also operating to rotate the optical part in another direction.

According to the invention, there is provided a support structure of an optical part placed in a path of a light beam of a system for optically reading out recorded information having first and second servo control systems for moving the light beam in a couple of directions which are perpendicular to each other, in which the optical part is incorporated in either of the first and second servo control systems and the support structure supports the optical part via an elastic member for permitting a movement of the optical part in a direction causing the movement of the light beam in one of the directions, the support structure is constructed so that a resonance frequency of a movement in a direction other than the direction of movement of the optical part can be controlled in a frequency range which is under a control of the other servo control system.

According to another aspect of the invention, the elastic member is made of a resin.

According to further aspect of the invention, a support structure of an optical part placed in an optical path of a light beam of a system for optically reading out recording information having first and second servo control systems for moving the light beam in a couple of directions which are perpendicular to each other, in which a direction of the optical part is controlled by the first servo control system, comprises a frame member fixed to the optical part on which a coil being supplied with a driving current from the first servo control system, is mounted, a source of magnetic fields which respectively cross different portions of the coil so as to produce a couple of forces to turn the frame member substantially around a first axis causing a rotational movement of the optical part in accordance with the operation of the first servo control system, and an elastic member connected to the frame member for permitting the movement of the frame member around the first axis, while resisting a movement of the frame member around a second axis perpendicular to the first axis, wherein the elastic member has a portion in which a diameter of a direction of the first axis is different from a diameter of a direction of the second axis, and whrein the diameters of the portion of the elastic member are selected so that resonant frequency of the movement of the frame member in the second direction is in a range controllable by an operation of the second servo control system.

Further scope of applicability of the present invention will become apparent from the detailed description given hereinafter. However, it should be understood that the detailed description and specific examples, while indicating a preferred embodiment of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the following description taken in conjunction with the accompanying drawings which are given by way of illustration only, and thus are not limitative of the present invention, and wherein:

FIG. 2 is a partly sectional side elevation of the support structure according to the present invention;

FIG. 3 is a partly sectional plan view of a major part of the support structure of FIG. 1; and FIG. 4 is a view taken on the plane of the line III—III of FIG. 2.

DETAILED DESCRIPTION OF THE PREFERRED EMBODIMENTS

Figure 1:
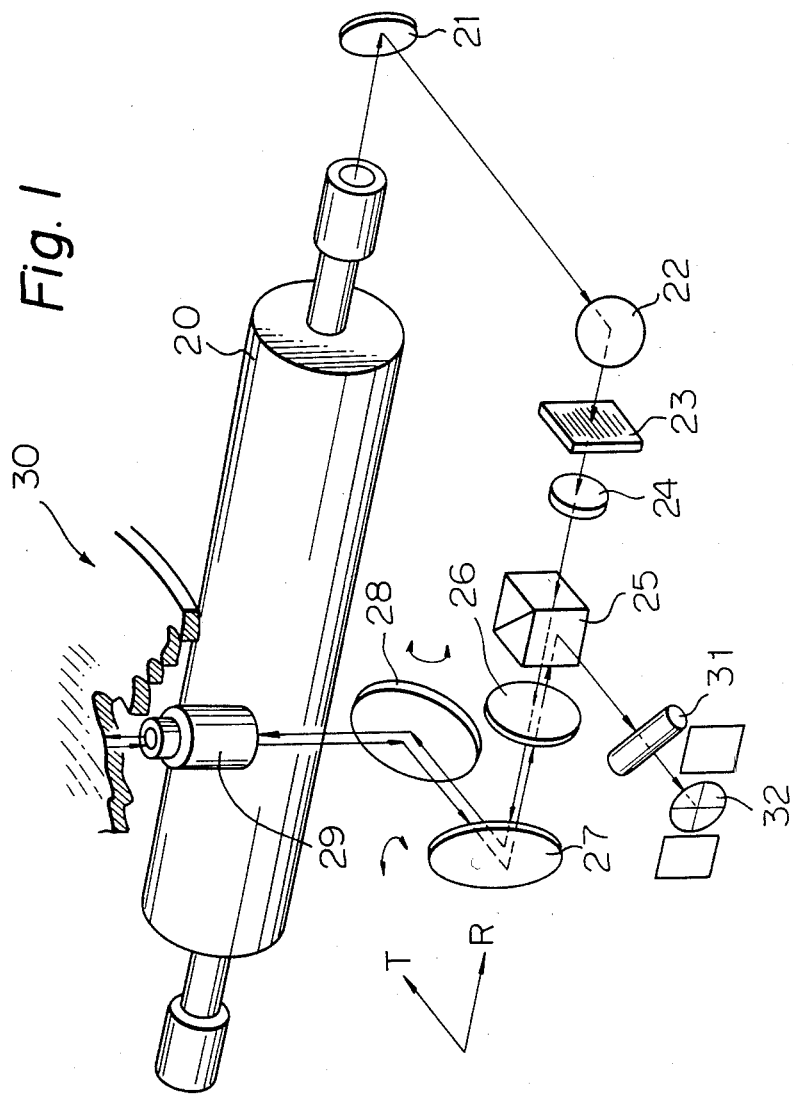
FIG. 1 is a perspective view of an optical path of a video disc player system in which the support structure according to the present invention may be utilized.

Before entering into an explanation of the support structure according to the present invention, reference is first made to FIG. 1, in which an optical path of a video disc player system is illustrated. As shown, a laser beam produced by a laser tube 20 is applied to a first fixed mirror 21. By the reflection at the first fixed mirror 21, the direction of the laser beam is turned about 90 degrees, and the laser beam is directed to a second fixed mirror 22 which is also provided to change the direction of the laser beam. A reflection of the laser beam from the second fixed mirror 2 is then applied to a prism 25 via a grating 23 and a diverging lens 24. The laser beam is then directed from the prism 25 to a tracking mirror 27 through a quarter wave plate 26. The tracking mirror is supported by a predetermined support device so as to be rotated around a vertical axis. A reflected laser beam at the tracking mirror 27 is then applied to a tangential mirror 28 which is also disposed to be rotatable around a horizontal axis, as shown by the curved arrow of the figure. A reflection of the laser beam from the tangential mirror 28 is then focused on a surface of a recording disc 30 by means of an object lens 29.

A reflection of the incident laser beam from the surface of the recording disc 30 travels the same optical path from the object lens 30 to the prism 25. At the prism 25, the reflected laser beam from the quarter wave plate 26 is reflected to a cylindrical lens 31, and further received by a photo detector 32. By a photoelectric transducing function of the photo detector, and the intensity of the reflected laser beam is transformed to the intensity of an electric output signal which will be used as a pickup signal. As readily understood from FIG. 1, the position of the incident laser beam on the surface of the recording disc 30 is controlled in accordance with the rotation of the tracking mirror 27 and the rotation of the tangential mirror 28. More precisely, an adjustment of the position of a spot the laser beam in a radial direction of the recording disc 30 (indicated by the arrow R in the figure) is performed by the rotation of the tracking mirror 27 which is controlled by an operation of a tracking servo control system. Similarly, an adjustment of the position of the spot of the laser beam in a tangential direction (indicated by the arrow T in the figure) is performed by the rotation of the tangential mirror 28 which is controlled by an operation of a tangential servo control system.

Reference is now made to FIG. 2 in which the embodiment of the support structure according to the present invention is illustrated.

The detail of the support structure is as follows. As shown, a mirror 11 which is to be used as the tracking mirror 27 of FIG. 1, for instance, is supported by means of an elastic member 12 so as to allow a rotational movement of a direction shown by the arrow X in the figure. A bobbin or a frame member 13 is fixed to the mirror 11 and a moving coil 14 is wound around an end of the bobbin 13. The end of the bobbin 13 with the coil 14 is placed in a magnetic circuit which consists of a magnet 15, yokes 16a and 16b, and a plate 17. The plate 17 defines a base member and is fixed to the magnet 15 via a member 18 which is made of a non-magnetic material.

The elastic member 12 is made by an injection process of a resin and has a pyramid portion between a base portion connected to the plate 17 and a tip portion connected to the mirror 11. With this configuration of the elastic member, the energy of resonance or vibration is easily dispersed.

With this arrangement, when a current having a direction shown in FIG. 2, is applied to the coil 14, a pair of forces of opposite directions as illustrated by the arrows of FIG. 2 are generated at an upper portion and a lower portion of the coil 14. If the direction of the current is inverted, the direction of the forces will be also inverted.

This mirror assembly will be placed in an optical path of an optical information read out system, in a manner that the direction of the movement of the mirror shown by the arrow X is parallel to the direction of the recording track or parallel to a direction normal to the direction of the recording track, so that a tangential servo system or a tracking servo system is operated by applying a signal corresponding to a tangential error signal or a tracking error signal. Also, it is possible to provide the tracking servo system and the tangential servo system by arranging two of mirror assemblies of this type in a optical path in a manner such that the direction of the axes thereof are perpendicular to each other.

The mechanics of the operation of the mirror assembly will be mathematically discussed hereinafter.

In the case of the arrangement shown in FIG. 2 through FIG. 4, a resonant frequency of the mirror 11 in the direction shown by the arrow X is determined simply in accordance with the bending stiffness of the elastic member 12 in the direction of the arrow X. More precisely, major factors for determining the bending stiffness of the elastic member 12 are a secondary moment of a section of the bending portion and a length of the bending portion.

If the length of the bending portion is constant, it is sufficient to take account of the secondary moment of the section of the bending portion. If we assume that the width of the bending portion in the direction X is h and the width of the direction Y is b, then the second moment of area in the direction X can be expressed to be $(1/12)bh^3$. Similarly, the second moment of area in the direction Y can be expressed to be $(1/12)hb^3$. This means that the second moment of area and consequently, the resonant frequency is determined in accordance with the widths h and b of the bending portion.

Accordingly, after determining the resonant frequency $f_0$ of the direction X to be an appropriate value, 70 Hz for example, the resonant frequency $f_0$ of the direction Y can be determined by selecting appropriate values of the widths h and b within a range which is controllable by the other servo device, such as the tangential servo system in the case the mirror assembly is used for the tracking servo system.

It will be appreciated from the foregoing that according to the present invention, an elastic member utilzed for supporting an optical part of a predetermined servo system for permitting a rotation or a translation of the optical part is designed so that the resonant frequency in the direction other than the direction of the rotation or translation of the optical part is within a desirable frequency range. Therefore it becomes possible to determine the resonant frequency of the mirror assambly in a direction other than the direction of the rotational movement within a range controllable by the other servo system.

It should be understood that the foregoing description is for illustrative purpose only, and is not intended to limit the scope of the invention. Rather, there are numerous equivalents to the preferred embodiment, and such are intended to be covered by the appended claims. As an example, in lieu of the movable coil structure for driving the mirror assembly used in the above embodiment, it is possible to use other types of driving device including a moving magnet, or other type of electro-magnetic driving mechanism. In addition, an optical part other than the mirror such as an object lens can be adapted to the support structure according to the present invention. Furthermore, the movement of the optical part may be a parallel translation as well as the rotational movement which was the case in the preferred embodiment.

What is claimed is:

1. A support structure of an optical part placed in a path of a light beam of a system for optically reading out recorded information, said system having first and second servo control systems for respectively moving the light beam in a pair of directions which are perpendicular to each other, in which the optical part is incorporated in either of the first and second servo control systems, the support structure comprising:

an elastic member for supporting and permitting a movement of the optical part in a direction causing the movement of the light beam in one of said directions, the support structure being constructed so that a resonance frequency of a movement in a direction other than said direction of movement of the optical part can be controlled in a frequency range which is within a controllable frequency range of the other servo control system.

2. A support structure as set forth in claim 1, wherein said elastic member is made of a resin.

3. A support structure of an optical part placed in an optical path of a light beam of a system for optically reading out recording information, said system having first and second servo control systems for respectively moving the light beam in a pair of directions which are perpendicular to each other, in which a direction of said optical part is controlled by said first servo control system, comprising:

a frame member fixed to said optical part on which a coil being supplied with a driving current from said first servo control system is mounted;

a source of magnetic fields which respectively cross different portions of said coil so as to produce a pair of forces to turn said frame member substantially around a first axis causing a rotational movement of said optical part in accordance with the operation of said first servo control system; and an elastic member connected to said frame member for permitting the movement of said frame member around said first axis, while resisting a movement of said frame member around a second axis perpendicular to said first axis, wherein said elastic member has a portion in which a diameter in a direction along said first axis is different from a diameter in a direction along said second axis, and wherein said diameters of the portion of the elastic member are selected so that resonant frequency of the movement of said frame member in said second direction is in a range controllable by an operation of said second servo control system.

4. A support structure of an optical part as set forth in claim 3, wherein:

said source of magnetic field is a magnetic circuit having a pair of magnetic gaps which have the same direction of magnetic field;

said frame member has a bobbin of a generally rectangular shape upon which said coil is wound;

said elastic member is connected to said frame member at a central part of a main face thereof to support said frame member so that two opposed portions of said coil which are parallel to said first axis are respectively placed within said magnetic gaps; and said portion of said elastic member has a generally rectangular cross section in parallel with said main face of the frame member and two opposing sides of the rectangular cross section.

5. A support structure as set forth in claim 4, wherein said magnetic circuit includes a magnet, a pair of yokes provided at each pole of said magnet, and a center piece placed between said yokes to form said magnetic gaps, and wherein said elastic member is connected between said center piece of said magnetic circuit and said frame member.

6. A support structure as set forth in claim 5, wherein said elastic member has a portion having a form of generally truncated pyramid and having a first face connected to said center piece and a second face connected to said frame member.

7. A support structure of an optical part placed in the path of a light beam in a system for optically reading recorded information, said system having a first servo control system for moving the light beam in a first direction, and a second servo control system for moving the light beam in a second direction perpendicular to said first direction, said optical part being incorporated into said first optical control system, said support structure comprising:

a base member; and means, mechanically coupled to said base element and to said optical part, for permitting said optical part to move in said first direction, and being dimensioned to exhibit a resonance frequency in said second direction which is within a controllable frequency range of said second servo control system.

* * * * *